United States Patent Office 3,234,096
Patented Feb. 8, 1966

3,234,096
COMPOSITIONS AND METHOD FOR PERFORMING PREGNANCY TESTS
William Pollack, Princeton, N.J., assignor to Ortho Pharmaceutical Corporation, a corporation of New Jersey
No Drawing. Filed Mar. 7, 1961, Ser. No. 93,839
11 Claims. (Cl. 167—84.5)

The present invention relates to a pregnancy test and, more particularly, to a novel reagent that is useful in determining pregnancy.

The injection of female human urine into test animals to determine pregnancy is well known. The Friedman modification of the Aschheim-Zondeck test uses rabbits as the test animals. While ova continually mature and Graafian follicles ripen in the ovaries or rabbits, ovulation does not take place until after copulation. Thus, in properly caged female rabbits, it is possible to study the effect of injected female human urine on ovaries previously free of Corpora hemorrhagica. In the Friedman test, a rabbit is injected with the urine to be tested. The animal is sacrificed after 36 to 48 hours and the ovaries examined.

The time required (usually more than 48 hours) to complete the Friedman test is a serious disadvantage of this method of determining pregnancy. The Friedman test is costly due largely to the inconvenience and expense of maintaining a large rabbit colony. The results of this test are reliable only if the rabbit has not recently copulated, is not pregnant and has not been used for a test animal in the previous six weeks or two months.

One object of the present invention, therefore, is to provide a serological test that will enable the clinician to dispense with the usual test animals.

An additional object of this invention is to provide a new and reliable method of determining pregnancy at an early date.

Yet another object of this invention is to provide a test reagent useful in determining pregnancy.

In view of the obvious disadvantages in the use of test animals, it is not surprising that many attempts have been made to develop a serological test for pregnancy. It is known that chorionic gonadotrophin is present in pregnancy urine and the antigenicity of this material has been suggested by Leatham and others. Schuyler used rabbit chorionic gonadotrophin anti-serum in a serological test for pregnancy and reported that it was necessary to absorb the serum prior to use. The test developed by Schuyler, however, was less accurate than the Salmon test. Attempts have also been made to improve the reliability of the serological test by purifying the human chorionic gonadotrophin hormone to remove interfering antigens present in non-pregnant human urine. It was discovered, however, that the degree of purification was difficult to control and that the purification process, if carried too far, destroyed the antigenicity of the human chorionic gonadotrophin hormone.

The method of the present invention depends upon the inhibition of a pregnancy anti-serum, which has been diluted in buffers, by the hormone present in the patient's urine, after suitable incubation. Following incubation, the urine-anti-serum mixture is added to a suspension of small solid particles coated with human chorionic gonadotrophin hormone. When these two compositions are mixed and incubated together at 37° C. for periods up to about 2 hours, agglutination of the solid particles will take place if no inhibition of the antibody has occurred and these particles can then be sedimented by light centrifugation. The examination of the supernatant will indicate the presence of or absence of chorionic gonadotrophin hormone in the patient's urine. If the supernatant is cloudy, the test is positive. If the supernatant is clear, the test is negative. This method gives excellent correlation with toad and frog tests for pregnancy.

The pregnancy anti-serum used is produced by injecting human chorionic gonadotrophin hormone assaying between about 1700 and about 2200 international units per milligram into rabbits. Special purification of the commercially available chorionic gonadotrophin hormone is unnecessary. After about 5 weeks, the rabbits are sacrificed and the serum of each rabbit is tested against human chorionic gonadotrophin hormone. The anti-serum giving a positive reaction with a low concentration of the antigen is pooled and standardized.

The suspension of human chorionic gonadotrophin hormone coated particles is a critical aspect of the present invention since the size and shape of the particles in suspension affects both the amount of chorionic gonadotrophin hormone that may be adsorbed on the surface of the particles and sedimentation of the particles in the presence of anti-serum. It is particularly important to the reliability of the test method described that the solid particles in suspension be of uniform size and shape. Such suspensions can be obtained by the polymerization of styrene under controlled conditions and such polystyrene suspensions are satifactory for the practice of the present invention. Particularly preferred are polystyrene suspensions prepared by the Dow Chemical Company of Midland, Michigan, and identified as Batches LS–066A and LS–449E. The polystyrene particles in these batches are approximately spherical in shape and have an average diameter of about 0.8140 micron and about 0.8020 micron respectively. These polystyrene spheres are believed to have a molecular weight in excess of 200,000.

Particles substantially larger than about 0.81 micron in diameter are readily spun down in the centrifuge and such large particles under the conditions of the present test would tend to give false negative reactions. Particles that are substantially smaller than about 0.80 micron in diameter, because they have a larger surface area, require more chorionic gonadotrophin hormone to coat this surface. Unless this additional chorionic gonadotrophin hormone is provided, many of the suspended particles are not coupled to the antigen and remain in suspension to give a false positive test.

As indicated above, the amount of chorionic gonadotrophin that is absorbed on the polystyrene particles is related to the surface area and since the particles are approximately spherical in shape, the amount of chorionic gonadotrophin hormone that may be adsorbed on the surface is proportional to the square of the diameter (surface of a sphere equals $\pi d^2$. It may be calculated that polystyrene particles having an average diameter of 0.264 micron can adsorb 9.4 times the amount of chorionic gonadotrophin hormone that is adsorbed by an equal weight of polystyrene particles having an average diameter of 0.81 micron and this conclusion may be substantiated experimentally. It will be appreciated, therefore, by those skilled in the art that the sensitivity of the test method described and claimed may be greatly increased by decreasing the average diameter of the particles in suspension, but at the expense of using much more chorionic gonadotrophin hormone to coat the suspended particles.

For a fuller understanding of the invention, reference will be made to the following examples which are given as specific illustration. It will be understood, however, that the invention is not limited to the specific details set forth in the illustrations.

*Example I.—Preparation of pregnancy anti-serum*

A relatively concentrated solution of human chorionic gonadotrophin is prepared by dissolving human chorionic gonadotrophin, assaying between about 1700 and 2200 international units per milligram, in 0.15 N saline to give a concentration of 100,000 international units per milliliter. This solution is mixed with an equal volume of Freund's complete adjuvant. The human chorionic gonadotrophin was supplied by the Vitamerican Company.

A second and more dilute solution of human chorionic gonadotrophin was prepared by dissolving human chorionic gonadotrophin in 0.15 N saline to give a concentration of 10,000 international units per milliliter. Again the human chorionic gonadotrophin employed was supplied by Vitamerican Company and assayed between about 1700 and about 2200 international units per milligram.

Rabbits are employed as the host animal. One milliliter of the concentrated solution containing 50,000 international units of human chorionic gonadotrophin per milliliter is given intramuscularly to each rabbit, followed three weeks later by one intravenous injection of the dilute solution containing 10,000 international units of human chorionic gonadotrophin on each of 3 consecutive days. All of the rabbits are bled by cardiac puncture 10 to 14 days after the last injection and the serum from each rabbit is collected separately. Each rabbit serum, after heating at 56° C. for 30 minutes, is tested against solutions of human chorionic gonadotrophin containing 250 and 100 international units per milliliter of the antigen, respectively. The anti-sera showing precipitation (++) with the 100 international units per milliliter sample are pooled together. To the rabbit anti-sera pooled together is added sodiumethylmercurithiosalicylate (merthiolate) to give a final concentration of 1:5000.

One volume of the pooled anti-sera is diluted with 15 volumes of an imidazole solution.

The imidazole solution is prepared by adding 6 milliliters of 0.1 N hydrochloric acid to 25 milliliters of a 0.2 molar imidazole solution and adding distilled water to a total volume of 100 milliliters. To this imidazole solution is added 0.7 gram of sodium chloride, 0.032 gram of sodium salicylate, 20 milliliters of 30% bovine albumin and sufficient sodiumethylmercurithiosalicylate to give a final concentration of 1:10,000.

The diluted anti-serum is sterile filtered through a D–8 to a D–10 asbestos pad and vialed.

*Example II.—Preparation of antigen suspension*

One volume of a polystyrene latex obtained from Difco Laboratories of Detroit, Michigan, identified as Bacto-Latex 0.81 and having an average particle diameter of 0.81 micron is diluted with 9 volumes of a borate buffer having a pH of 8.2. The borate buffer is prepared by adding 35 milliliters of 0.05 molar sodium borate to 65 milliliters of 0.2 molar boric acid and adding 0.85 gram of sodium chloride. The concentration of polystyrene solids in the Bacto-Latex is 2% by volume and the concentration of polystyrene solids in the diluted borate buffer solution is about 0.2% by volume. One volume of the diluted latex (1% polystyrene solids) is further diluted with an equal volume of the borate buffer solution containing 40 international units per milligram of human chorionic gonadotrophin. After thorough mixing, the mixture is left overnight at 2–8° C. before using.

*Example III.—Test procedure*

The urine to be tested should be the first morning specimen and must be tested within 12 hours. The urine sample submitted is centrifuged at high speed for 3 minutes and the clear supernatant is decanted for testing.

To 0.25 milliliter of the diluted pregnancy anti-serum in a 10 x 75 mm. test tube is added 0.25 milliliter of the centrifuged urine. The contents of the test tube are mixed well and incubated in a water bath at 37° C. for 1 hour. The antigen suspension prepared as described in Example II above is mixed thoroughly and 0.5 milliliter of this suspension is added to the mixture in the test tube. The contents of the test tube are again mixed well and incubated in a water bath at 37° C. for 2 hours. The contents of the test tube are then centrifuged for 2 minutes at 1000 times gravity and the clarity of the supernatant is compared with a well mixed turbidity standard against a black background. The turbidity standard may be the McFarland nephelometer turbidity standard as described at page 583 of Approved Laboratory Techniques, Kolmer Spaulding and Robinson (5th Edition). If the supernatant is less turbid than the standard, the pregnancy test is negative. If the supernatant is more turbid than the standard, the pregnancy test is positive.

It is an advantage of the test procedure described above that highly purified human chorionic gonadotrophin is unnecessary. It has been established that phosphates and similar concomitant substances present in the patient's urine have little or no influence on the test. Because the anti-sera described in Example I is highly diluted, very small amounts of rabbit anti-sera are necessary.

While the invention has been described with reference to the specific embodiments, it is to be understood that it is not to be limited thereto, but is to be construed broadly and restricted solely by the scope of the appended claims.

What is claimed is:

1. A suspension in a polar liquid of finely divided solid particles having an average diameter of about 0.81 micron and coated with human chorionic gonadotrophin.

2. A suspension in a polar liquid of finely divided solid particles having an average diameter of about 0.81 micron and coated with human chorionic gonadotrophin, the pH of the suspension being from about 7.9 to about 8.8.

3. A suspension in a polar liquid of about 0.1 percent by volume of finely divided solid particles having an average diameter of about 0.81 micron and coated with human chorionic gonadotrophin.

4. An aqueous suspension of polystyrene particles having an average diameter of about 0.81 micron coated with human chorionic gonadotrophin.

5. An aqueous suspension of about 0.1 percent by volume of polystyrene particles having an average diameter of about 0.81 micron coated with human chorionic gonadotrophin.

6. An aqueous suspension of about 0.1 percent by volume of polystyrene particles having an average diameter of about 0.81 micron coated with human chorionic gonadotrophin, the pH of the suspension being from about 7.9 to about 8.8.

7. A suspension of finely divided polystyrene particles having an average diameter of about 0.81 micron and coated with human chorionic gonadotrophin in an aqueous borate buffer having a pH of about 8.2.

8. A method of determining pregnancy which comprises the steps of:
  incubating at about 37° C. a mixture of human female urine and anti-human chorionic gonadotrophin,
  adding a suspension of finely divided particles coated with human chorionic gonadotrophin and having an average diameter of about 0.81 micron,
  incubating for about two hours at about 37° C.,
  centrifuging and comparing the supernatant with a turbidity standard.

9. The method of claim 8 in which the suspension of finely divided particles has a pH in the range of about 7.9 to about 8.8.

10. The method of claim 8 in which the anti-human chorionic gonadotrophin is produced by injecting human chorionic gonadotrophin into a lower animal, bleeding the animal, and separating the anti-human chorionic gonadotrophin from the blood so obtained.

11. A method of determining pregnancy which comprises the steps of:
  incubating at about 37° C. for one hour a mixture of human female urine and anti-human chorionic gonadotrophin, adding a suspension of polystyrene particles coated with human chorionic gonadotrophin and having an average diameter of about 0.81 micron,
incubating for about two hours at about 37° C.,
centrifuging for about two minutes at about 1000 g. and comparing the supernatant with a turbidity standard.

References Cited by the Examiner

Chase, Yale J. Biol. and Med., vol. 17, No. 4, 1945, p. 520.

Difco Laboratories, Detroit, Mich., Bacto-Latex 0.81, Code 3102, advertisement, 1960.

Gofton, Canad. Med. Assoc. J., vol. 77, pp. 1098–1102, Dec. 15, 1957.

Innella, J. Am. Med. Assoc., vol. 171, No. 7, pp. 121–885, 1959.

Kelen, Can. J. Microbiol., vol. 6, 1960, pp. 463–473.

Martin, Surg. Gyn. and Obst., vol. 96, No. 5, May 1953, pp. 625–626.

McKean, Am. J. of Obst. and Gynecol., vol. 80, pp. 596–600, 1960.

Rheins, J. Lab. and Clin. Med., vol. 84, No. 5, July 1957, pp. 113–118.

Rheins, Proc. Soc. Exptl. Biol. and Med., vol. 96, No. 1, p. 67, October 1957.

Rheins, Proc. Soc. Exptl. Biol. and Med., vol. 97, No. 3, p. 632, 1958.

Saslaw, Proc. Soc. Exptl. Biol. and Med., vol. 97, No. 3, March 1958, pp. 700–703.

Schuyler et al., Proc. Soc. Exptl. Biol. and Med., vol. 75, pp. 552–557, 1950.

Strausser, Rutgers Univ. Thesis, 1958, pp. 64 and 78, Univ. Microfilms, Inc., L. C. Card. No. Mic. 59–1831.

Thomas, Canad. Med. Assoc. J., vol. 76, p. 621, 1957.

JULIAN S. LEVITT, *Primary Examiner.*

WILLIAM B. KNIGHT, IRVING MARCUS, LEWIS GOTTS, *Examiners.*